US012664712B2

(12) United States Patent
Wang et al.

(10) Patent No.: US 12,664,712 B2
(45) Date of Patent: Jun. 23, 2026

(54) METHOD, ELECTRONIC DEVICE, AND COMPUTER PROGRAM PRODUCT FOR GENERATING VIDEO UTILIZING A FUSION VECTOR BASED ON REFERENCE IMAGE AND REFERENCE SPEECH

(71) Applicant: Dell Products L.P., Round Rock, TX (US)

(72) Inventors: Zijia Wang, London (GB); Zhisong Liu, Shenzhen (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 107 days.

(21) Appl. No.: 18/782,969

(22) Filed: Jul. 24, 2024

(65) Prior Publication Data

US 2026/0004495 A1      Jan. 1, 2026

(30) Foreign Application Priority Data

Jun. 28, 2024      (CN) ........................ 202410864995.X

(51) Int. Cl.
| | |
|---|---|
| *G06T 13/20* | (2011.01) |
| *G06T 13/40* | (2011.01) |
| *G06T 13/80* | (2011.01) |
| *G10L 15/02* | (2006.01) |

(Continued)

(52) U.S. Cl.
CPC ............ *G06T 13/205* (2013.01); *G06T 13/40* (2013.01); *G06T 13/80* (2013.01); *G10L 15/02*
(2013.01); *G10L 15/1815* (2013.01); *G10L 25/57* (2013.01); *G06T 2207/10016* (2013.01)

(58) Field of Classification Search
None
See application file for complete search history.

(56) References Cited

U.S. PATENT DOCUMENTS

2024/0013462 A1*   1/2024   Seol ...................... G06T 13/205
2025/0061649 A1*   2/2025   Li ........................... G06T 17/00

OTHER PUBLICATIONS

Comanducci et al. "Timbre Transfer Using Image-To-Image Denoising Diffusion Implicit Models", Jul. 28, 2023.*

(Continued)

*Primary Examiner* — Jeffrey J Chow
(74) *Attorney, Agent, or Firm* — Ryan, Mason & Lewis, LLP

(57) ABSTRACT

A method includes obtaining a reference image and a reference speech, the reference image specifying a head of a target object in the video, and the reference speech specifying a voice of the target object; and generating, based on the reference image and the reference speech, a fusion vector by combining a feature of the head and a feature of the voice. The method further includes generating, based on the fusion vector, a plurality of video frames in a video that represents the target object speaking in a timbre of the reference speech by denoising a plurality of initial frames including noise; and generating the video based on the plurality of video frames. In embodiments of the present disclosure, a video in which a semantic feature and a speaking style of the target object are merged can be generated, and the resolution and quality of the generated video are enhanced.

20 Claims, 6 Drawing Sheets

(51) Int. Cl.
   *G10L 15/18* (2013.01)
   *G10L 25/57* (2013.01)

(56) References Cited

OTHER PUBLICATIONS

L. Chen et al., "Hierarchical Cross-Modal Talking Face Generation with Dynamic Pixel-Wise Loss," Proceedings of IEEE Conference on Computer Vision and Pattern Recognition (CVPR), Jun. 2019, pp. 7832-7841.

E. Zakharov et al., "Few-Shot Adversarial Learning of Realistic Neural Talking Head Models," IEEE/CVF International Conference on Computer Vision, arXiv:1905.08233v2, Sep. 25, 2019, 21 pages.

K. Vougioukas et al., "End-to-End Speech-Driven Facial Animation with Temporal GANs," arXiv:1805.09313v4, Jul. 19, 2018, 14 pages.

Y. Song et al., "Talking Face Generation by Conditional Recurrent Adversarial Network," arXiv:1804.04786v3, Jul. 25, 2019, 7 pages.

J. S. Chung et al., "Lip Reading Sentences in the Wild," Proceedings of IEEE Conference on Computer Vision and Pattern Recognition (CVPR), Jul. 2017, pp. 6447-6456.

J. Ho et al., "Denoising Diffusion Probabilistic Models," arXiv:2006.11239v2, Dec. 16, 2020, 25 pages.

A. Nichol et al., "Improved Denoising Diffusion Probabilistic Models," arXiv:2102.09672v1, Feb. 18, 2021, 17 pages.

P. Dhariwal et al., "Diffusion Models Beat GANs on Image Synthesis," arXiv:2105.05233v4, Jun. 1, 2021, 44 pages.

M. Stypulkowski et al., "Diffused Heads: Diffusion Models Beat GANs on Talking-Face Generation," arXiv:2301.03396v2, Jul. 20, 2023, 11 pages.

S. Shen et al., "DiffTalk: Crafting Diffusion Models for Generalized Audio-Driven Portraits Animation," arXiv:2301.03786v2, Apr. 20, 2023, 10 pages.

A. Radford et al., "Learning Transferable Visual Models From Natural Language Supervision," International Conference on Machine Learning, arXiv:2103.00020v1, Feb. 26, 2021, 48 pages.

D. S. Park et al., "SpecAugment: A Simple Data Augmentation Method for Automatic Speech Recognition," arXiv:1904.08779v3, Dec. 3, 2019, 6 pages.

V. Panayotov et al., "Librispeech: An ASR Corpus Based on Public Domain Audio Books," Proceedings of IEEE International Conference on Acoustics, Speech and Signal Processing (ICASSP), Apr. 2015, 5 pages.

Z. Wang et al., "Deep Networks for Image Super-Resolution with Sparse Prior," Proceedings of IEEE International Conference on Computer Vision (ICCV), Dec. 2015, pp. 370-378.

C. Ledig et al., "Photo-Realistic Single Image Super-Resolution Using a Generative Adversarial Network," IEEE Conference on Computer Vision and Pattern Recognition (CVPR), arXiv:1609.04802v5, May 25, 2017, 19 pages.

A. Kappeler et al., "Video Super-Resolution With Convolutional Neural Networks," IEEE Transactions on Computational Imaging, vol. 2, No. 2, Jun. 2016, pp. 109-122.

X. Wang et al., "ESRGAN: Enhanced Super-Resolution Generative Adversarial Networks," IEEE Conference on Computer Vision and Pattern Recognition, Sep. 2018, 16 pages.

T. Xue et al., "Video Enhancement with Task-Oriented Flow," arXiv:1711.09078v3, Nov. 10, 2019, 20 pages.

J. Johnson et al., "Perceptual Losses for Real-time Style Transfer and Super-resolution," European Conference on Computer Vision, Sep. 17, 2016, 17 pages.

K. Simonyan et al., "Very Deep Convolutional Networks for Large-Scale Image Recognition," International Conference on Learning Representations, arXiv:1409.1556v6, Apr. 10, 2015, 14 pages.

I. J. Goodfellow et al., "Generative Adversarial Nets," Advances in Neural Information Processing Systems, arXiv:1406.2661v1, Jun. 10, 2014, 9 pages.

P. Isola et al., "Image-to-Image Translation with Conditional Adversarial Networks," IEEE Conference on Computer Vision and Pattern Recognition (CVPR), Jul. 2017, pp. 1125-1134.

N. Drobyshev et al., "MOPortraits: Emotion-enhanced Multimodal One-shot Head Avatars," Conference on Computer Vision and Pattern Recognition, Jun. 2024, pp. 8498-8507.

* cited by examiner

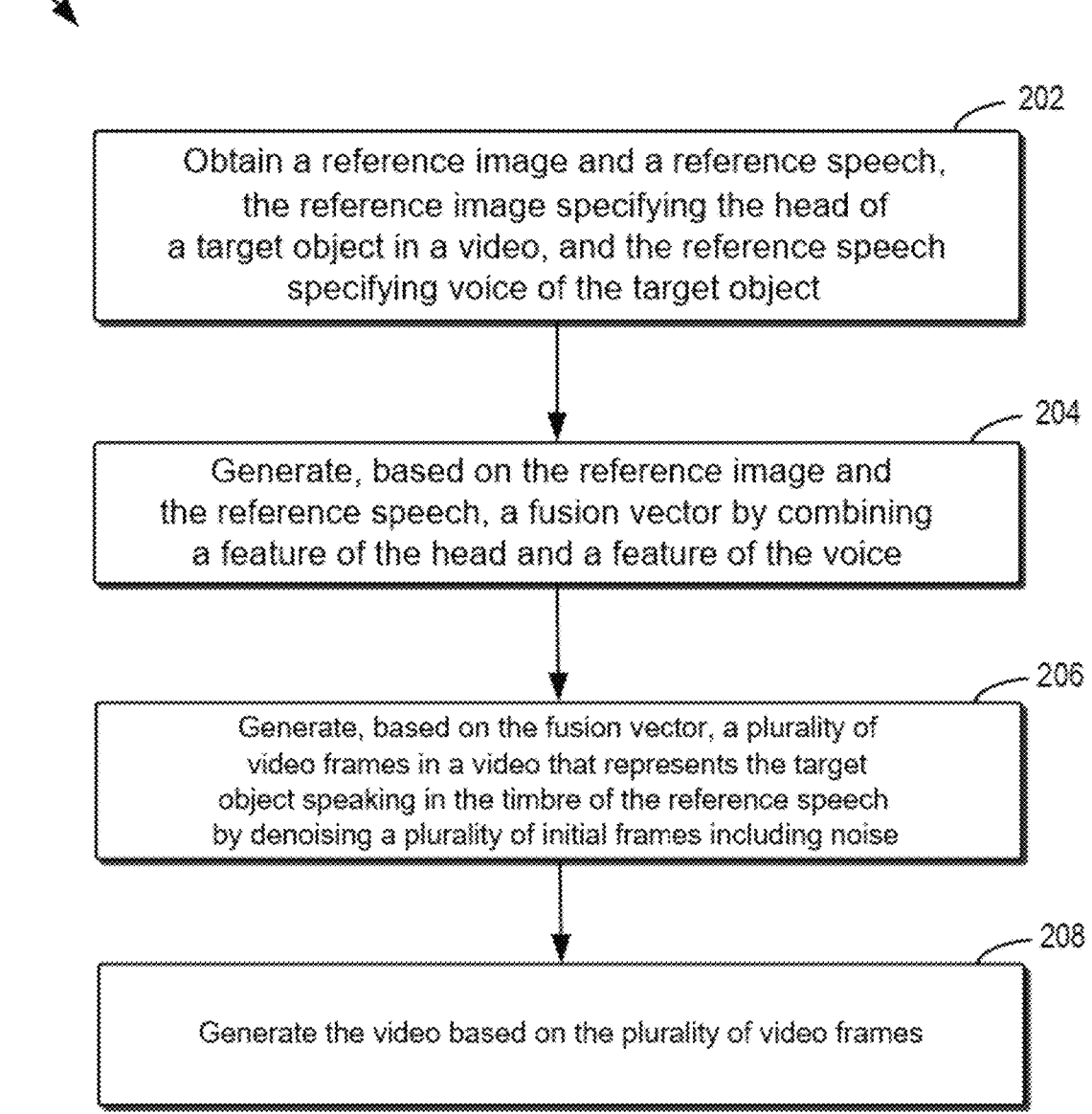

200

202
Obtain a reference image and a reference speech,
the reference image specifying the head of
a target object in a video, and the reference speech
specifying voice of the target object 204
Generate, based on the reference image and
the reference speech, a fusion vector by combining
a feature of the head and a feature of the voice 206
Generate, based on the fusion vector, a plurality of
video frames in a video that represents the target
object speaking in the timbre of the reference speech
by denoising a plurality of initial frames including noise 208
Generate the video based on the plurality of video frames

FIG. 2

METHOD, ELECTRONIC DEVICE, AND COMPUTER PROGRAM PRODUCT FOR GENERATING VIDEO UTILIZING A FUSION VECTOR BASED ON REFERENCE IMAGE AND REFERENCE SPEECH

RELATED APPLICATION

The present application claims priority to Chinese Patent Application No. 202410864995.X, filed Jun. 28, 2024, and entitled "Method, Electronic Device, and Computer Program Product for Generating Video," which is incorporated by reference herein in its entirety.

FIELD

Embodiments of the present disclosure relate to the field of computers, and more specifically, to a method, electronic device, and computer program product for generating a video.

BACKGROUND

Technology for generating a speaking avatar illustratively combines speech audio and a character avatar, and converts a static avatar into a dynamic avatar animation that can express speech content realistically by means of the generation technology. The technology for generating a speaking avatar may convert a static avatar image into dynamic avatar animation capable of following changes in speech content. This technology can enhance the realism and ability of expression of a character image, so that a virtual avatar can interact with a user more vividly and naturally.

SUMMARY

Embodiments of the present disclosure provide a method, electronic device, and computer program product for generating a video.

According to a first aspect of the present disclosure, a method for generating a video is provided. The method obtains a reference image and a reference speech, the reference image specifying a head of a target object in the video, and the reference speech specifying a voice of the target object. The method further includes generating, based on the reference image and the reference speech, a fusion vector by combining a feature of the head and a feature of the voice. The method further includes generating, based on the fusion vector, a plurality of video frames in a video that represents the target object speaking in a timbre of the reference speech by denoising a plurality of initial frames including noise. The method further includes generating the video based on the plurality of video frames.

According to a second aspect of the present disclosure, an electronic device is provided. The electronic device includes at least one processor, and a memory coupled to the at least one processor and having instructions stored therein, wherein the instructions, when executed by the at least one processor, cause the electronic device to perform actions. The actions include obtaining a reference image and a reference speech, the reference image specifying a head of a target object in the video, and the reference speech specifying a voice of the target object. The actions further include generating, based on the reference image and the reference speech, a fusion vector by combining a feature of the head and a feature of the voice. The actions further include generating, based on the fusion vector, a plurality of video frames in a video that represents the target object speaking in a timbre of the reference speech by denoising a plurality of initial frames including noise. The actions further include generating the video based on the plurality of video frames.

According to a third aspect of the present disclosure, a computer program product is provided. The computer program product is tangibly stored on a non-transitory computer-readable medium and comprises machine-executable instructions. The machine-executable instructions, when executed by a machine, cause the machine to perform actions. The actions include obtaining a reference image and a reference speech, the reference image specifying a head of a target object in the video, and the reference speech specifying a voice of the target object. The actions further include generating, based on the reference image and the reference speech, a fusion vector by combining a feature of the head and a feature of the voice. The actions further include generating, based on the fusion vector, a plurality of video frames in a video that represents the target object speaking in a timbre of the reference speech by denoising a plurality of initial frames including noise. The actions further include generating the video based on the plurality of video frames.

This Summary is provided to introduce the selection of concepts in a simplified form, which will be further described in the Detailed Description below. The Summary is neither intended to identify key features or essential features of the claimed subject matter, nor intended to limit the scope of the claimed subject matter.

BRIEF DESCRIPTION OF THE DRAWINGS

The above and other features, advantages, and aspects of embodiments of the present disclosure will become more apparent with reference to the accompanying drawings and the Detailed Description below. In the accompanying drawings, identical or similar reference numerals indicate identical or similar elements, in which:

FIG. 2 is a flow chart of a method for generating a video according to an example implementation of the present disclosure;

In all of the drawings, identical or similar reference numerals indicate identical or similar elements.

DETAILED DESCRIPTION

Figure 1:
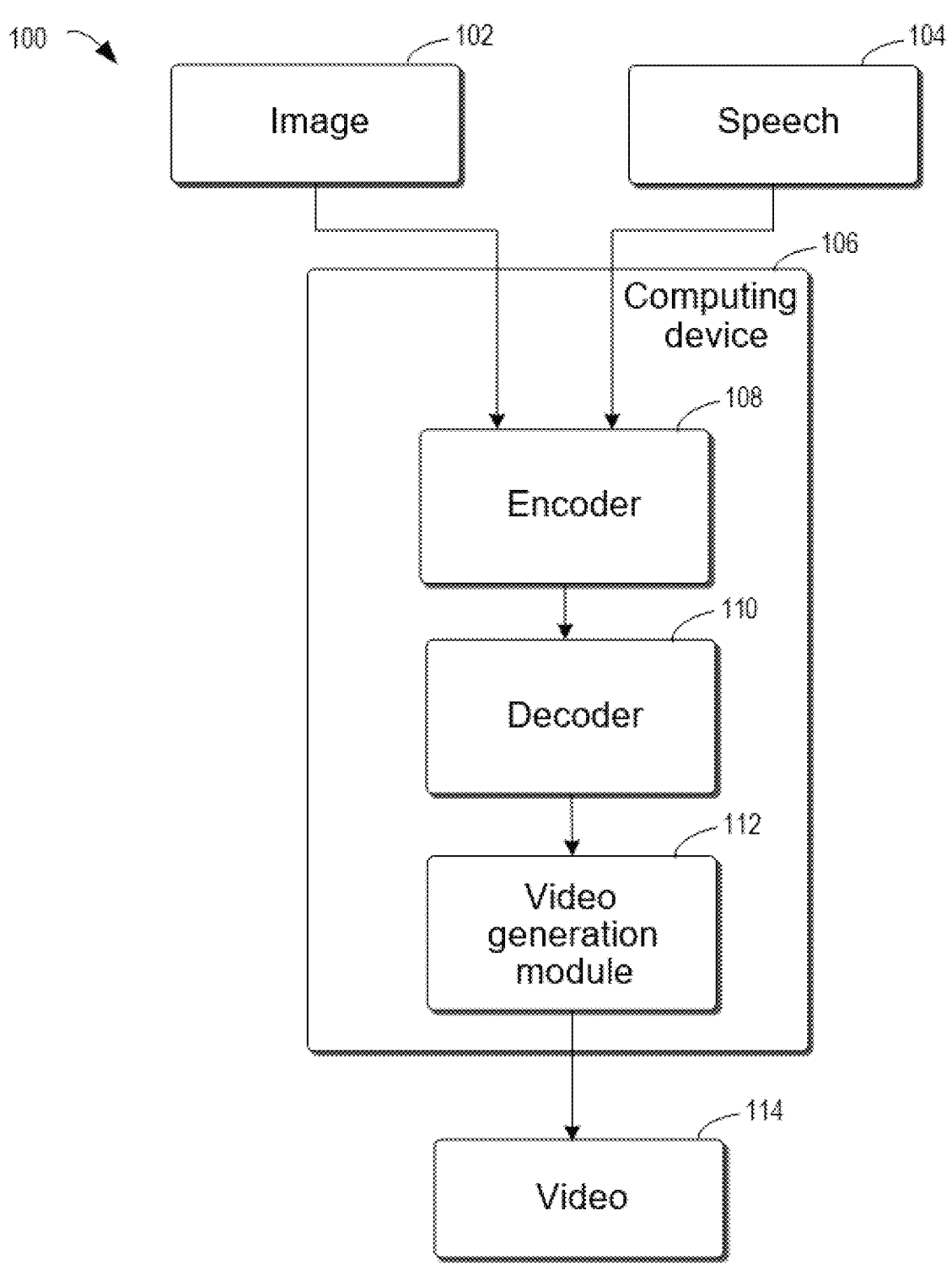
FIG. 1 is a schematic diagram of an example environment in which an embodiment of the present disclosure can be implemented.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below. Additionally, all specific numerical values herein are examples, which are provided only to aid in understanding, and are not intended to limit the scope.

As discussed in the Background above, a static avatar image may be converted into dynamic avatar animation capable of changing with speech content. This technology can enhance the realism and ability of expression of a character image, so that a virtual avatar can interact with a user more vividly and naturally. This requires precise control of each facial action of a virtual character, such as smiling, astonishment, and other expressions, while maintaining synchronization with the speech. Speaking avatar generation is a task intended to synthesize realistic and expressive facial animation from a speech input. It has various applications in video communication, content creation, and entertainment.

Conventional methods for generating a speaking avatar may be roughly classified into two types: a reference-based avatar generation method and a reference-free avatar generation method. The reference-based method requires additional reference videos or images to guide the generation process. For example, a hierarchical cross-modal network learns to disentangle from a reference video and transmit identity and expression information. As another example, a few-shot adversarial learning framework utilizes a meta learning module to adapt to invisible identities from a small number of images. As yet another example, an end-to-end trainable network uses a single image and audio sequence to generate a high-fidelity speaking avatar video.

The reference-free method does not rely on any reference data, but uses only speech as input. For example, a Wave-Net-based speaking face generation model may synthesize a lip motion and a facial expression from an original waveform. As another example, a one-time speaking head synthesis method uses a single identity image and audio sequence to generate a realistic speaking face video with a head motion and blinking.

A diffusion model has also been applied to speaking avatar generation, and shows encouraging results in terms of quality and diversity. For example, an autoregressive diffusion model requires only one identity image and one audio sequence to generate a realistic speaking head video with a head motion, a facial expression, and background retention. As another example, a diffusion model combines a reference facial image and a landmark point as a condition for personalized perceptual generalized synthesis.

However, the speech input contains rich information about a speaker's content and style, such as words, prosody, sentiment, and accent. How to effectively extract and encode this information to generate a speaking head is a challenge. An identity image provides the appearance and personality of the speaker, such as face shape, hair style, skin color, and facial expressions. How to save this information and transmit it to a generated frame is a challenge.

The generated video frame should have high resolution, a realistic texture, natural expressions, and consistent motions. How to use a diffusion-based generative model to implement these characteristics is a challenge. The generated video frame should further match the speech input in terms of lip synchronization, head postures, and facial action units. How to use a multi-modal encoding solution to ensure alignment of these characteristics is a challenge.

From this, it may be seen that speaking avatar generation is a challenging task that requires generating realistic and expressive facial animation from a speech input. Even though existing diffusion model-based methods have shown encouraging results, they suffer from problems of low resolution and limited diversity, and cannot consider semantic features and personal style features when generating a video. Therefore, there is a need for a novel framework that can combine multi-modal encoding and super resolution to improve the quality and diversity of the generated speaking avatar.

In order to overcome the above disadvantages, an embodiment of the present disclosure provides a solution for generating a video. This solution may generate a high-quality and personalized speaking head video from a speech input and a single identity image, and may realize high-quality and personalized video communication and content creation for various applications (such as virtual conferences, online education, and entertainment). This solution uses a Contrastive Language-Image Pre-Training (CLIP)-based encoder to learn a joint representation of speech and identity image, which may capture semantic and style information from two modalities (speech and image). This solution uses a diffusion-based decoder to sample high-resolution frames that take encoder output as a condition, which may generate realistic and diverse facial expressions and head motions. In some embodiments, this solution further introduces an end-to-end loss function that combines perception, adversarial, and lip synchronization losses to optimize the generation process.

FIG. 1 is a schematic diagram of an example environment 100 in which an embodiment of the present disclosure can be implemented. As shown in FIG. 1, the example environment 100 may include a computing device 106. The computing device 106 may be, for example, a computing system or a server. A program or software for generating a video may be installed on the computing device 106, specifically including an encoder 108, a decoder 110, and a video generation module 112.

The encoder 108 may receive an image 102 and a speech 104. The image 102 specifies a feature of a head (e.g., a portion of a head including a face) of the person speaking in a video to be generated. The speech 104 specifies a feature of a voice of the person speaking in the video to be generated. The encoder 108 may be a CLIP-based encoder, which aims to learn a joint representation of speech and identity image, so as to be able to capture semantic and style information from the two modalities.

The decoder 110 may be a diffusion-based decoder, which aims to sample a high-resolution frame according to a fusion feature vector from the encoder 108, and may generate high-quality and diverse samples for image and video synthesis. The video generation module 112 may be a super-resolution module, which aims to improve the resolution and quality of video frames generated by the diffusion-based decoder, and ultimately generate a video 114. Specifically, a single image super-resolution method is first applied separately to each frame, and then a video super-resolution method is jointly applied to the entire sequence. In this way, spatial and temporal information in the generated video frames may be utilized to improve their resolution and video quality.

It should be understood that description of the architecture and function in the example environment 100 is made for illustrative purposes only and does not imply any limitation to the scope of the present disclosure. Embodiments of the present disclosure may further be applied to other environments having different structures and/or functions.

Figure 3:
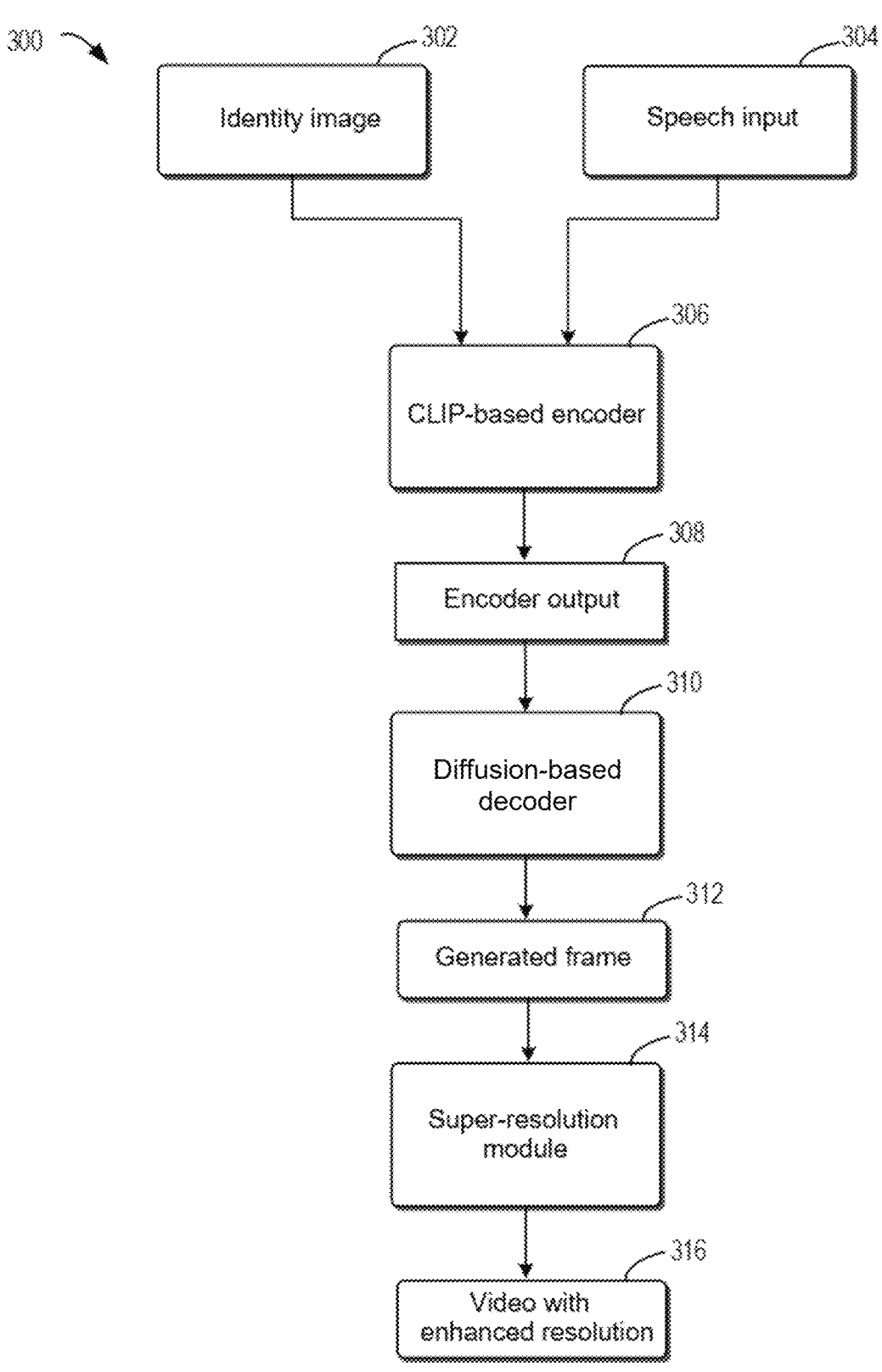
FIG. 3 is a block diagram of an overall framework for generating a video according to an example implementation of the present disclosure.

FIG. 2 is a flow chart of a method 200 for generating a video according to an example implementation of the present disclosure. FIG. 3 is a block diagram of an overall framework 300 for generating a video according to an example implementation of the present disclosure. The method for generating a video provided in embodiments of the present disclosure will be described below in conjunction with FIG. 2 and FIG. 3. For case of understanding, the specific data mentioned in the following description is all intended for purposes of illustration only and is not intended to define the scope of protection of the present disclosure. It can be understood that the embodiments described below may further include additional actions not shown and/or may omit actions shown, and the scope of the present disclosure is not limited in this regard.

At a block 202, a reference image and a reference speech are obtained, the reference image specifying the head of a target object in a video, and the reference speech specifying voice of the target object. For example, a CLIP-based encoder 306 (which may correspond to the encoder 108 in FIG. 1) obtains an identity image 302 (which may correspond to the image 102 in FIG. 1) and a speech input 304 (which may correspond to the speech 104 in FIG. 1). The identity image 302 may specify the head of the target object in the video. The speech input 304 specifies the voice of the target object.

At a block 204, based on the reference image and the reference speech, a fusion vector is generated by combining a feature of the head and a feature of the voice. For example, the CLIP-based encoder 306 generates an encoder output 308 (e.g., a fusion vector) based on the identity image 302 and the speech input 304 by combining the feature of the head and the feature of the voice.

At a block 206, based on the fusion vector, a plurality of video frames in the video that represents the target object speaking in the timbre of the reference speech are generated by denoising a plurality of initial frames including noise. For example, a diffusion-based decoder 310 (which may correspond to the decoder 110 in FIG. 1) may generate, based on the encoder output 308 (e.g., a fusion vector), a plurality of video frames 312 in the video that represents the target object in the identity image 302 speaking in the timbre of the speech input 304 by denoising a plurality of initial frames including noise.

At a block 208, the video is generated based on the plurality of video frames. For example, a super-resolution module 314 (which may correspond to the video generation module 112 in FIG. 1) may generate an enhanced video 316 based on the plurality of video frames 312. In summary, one identity image and one speech input are given, and semantic and style features are first extracted and fused from the two modalities using the CLIP-based encoder. Then, high-resolution frames are sampled using the diffusion-based decoder according to the encoder output. Finally, the super-resolution module is applied to enhance the resolution and quality of the generated video frames.

Super-resolution technology may be divided into two categories: single image super-resolution and video super-resolution. A single image super-resolution method takes a single low-resolution image as input and outputs a high-resolution image. A video super-resolution method takes a series of low-resolution frames as input and outputs a series of high-resolution frames. The present disclosure utilizes a hybrid method that combines the single image super-resolution and the video super-resolution to enhance the resolution and quality of the generated frames. Specifically, the single image super-resolution method is first applied separately to each frame, and then the video super-resolution method is jointly applied to the entire sequence. In this way, spatial and temporal information in the generated frames may be utilized to improve their resolution and quality.

In some embodiments, an Enhanced Super-Resolution Generative Adversarial Network (ESRGAN) model may be used as a module that supports the single image super-resolution, which is an example of a generative adversarial network (GAN) that may generate photo-like realistic images with enhanced details. In some embodiments, a Temporally-Deformable Alignment Network (TDAN) model may be used as a module for the video super-resolution, which is an example of a recurrent neural network (RNN) that may utilize temporal dynamics and alignment to generate coherent videos with high resolution. The super-resolution module may effectively enhance the resolution and quality of the frames generated by the diffusion-based decoder. The enhanced frames have clearer details, clearer edges, and smoother transitions.

In this way, by implementing the method 200, a joint representation of speech and identity image may be learned, so that the semantic and style information from the two modalities may be captured. This can improve the realism and diversity of the generated speaking avatar as well as the consistency between lip motion and speech content.

Figure 4:
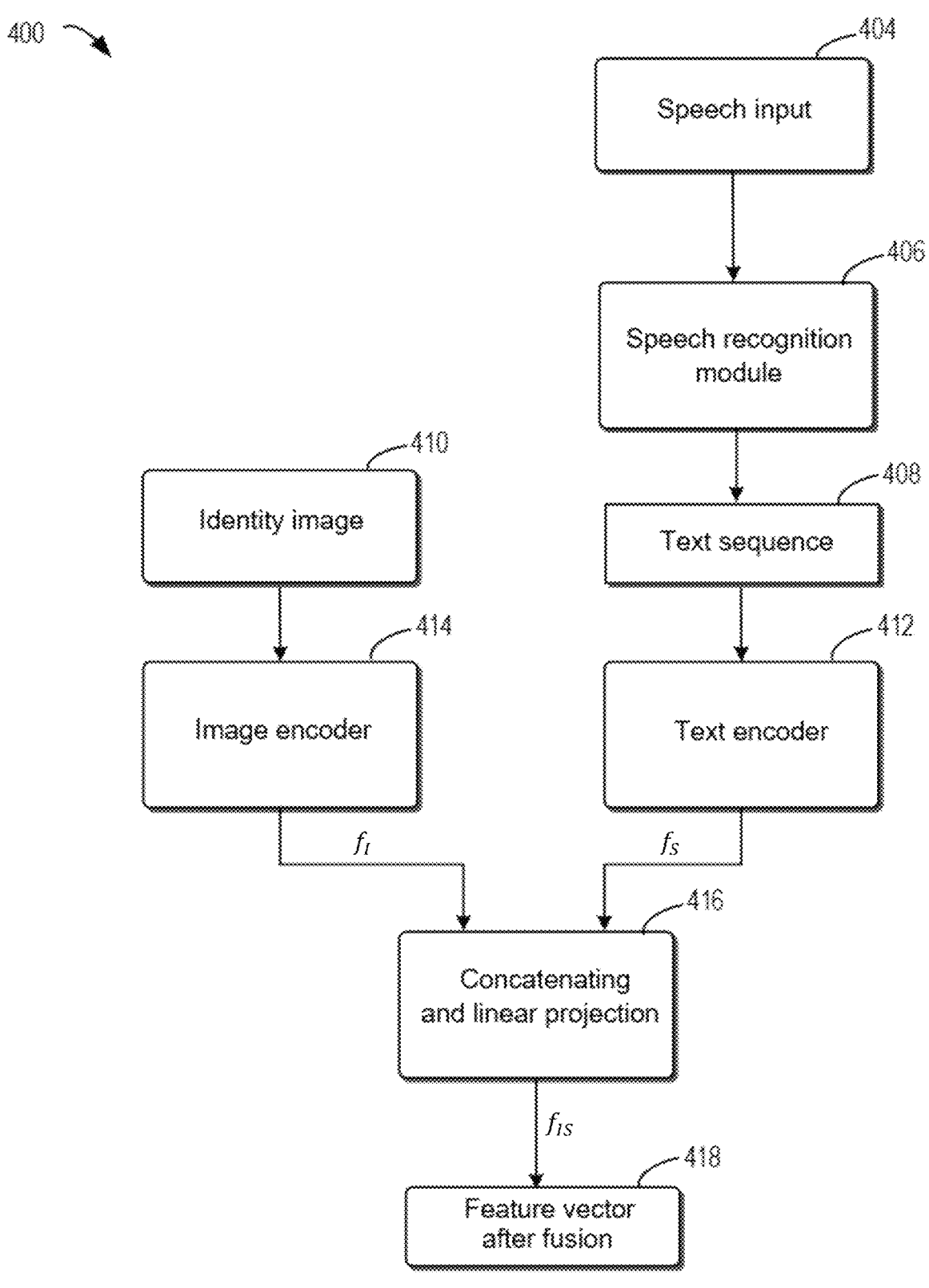
FIG. 4 is a block diagram of details of an encoder for generating a video according to an example implementation of the present disclosure.

FIG. 4 is a block diagram of details 400 of an encoder for generating a video according to an example implementation of the present disclosure. A CLIP-based encoder aims to learn a joint representation of speech and identity image, so as to be able to capture semantic and style information from the two modalities. As shown in FIG. 4, a CLIP is used as a backbone of an encoder, which is a pre-trained visual language model that may encode images and text into a common embedding space. The CLIP performs well in various visual language tasks, such as image captioning, image retrieval, and zero sample classification.

Specifically, the CLIP-based encoder includes a text encoder 412 and an image encoder 414. The image encoder 414 is used to encode an identity image 410 into a feature vector $f_I$. A speech input 404 is first transcribed into a text sequence 408 through a speech recognition module 406, and then the text sequence 408 is encoded into a feature vector $f_S$ by using a text encoder 412. This is to align a speech feature with an image feature, so a speech recognition model of the speech recognition module 406 is used to transcribe speech input into the text sequence, and then the text sequence is input into the text encoder 412. The speech recognition model is pre-trained on a large-scale speech data set and may achieve high precision in various languages.

In order to fuse the image feature and the speech feature, in a concatenating and linear projection module 416, a concatenating operation is first used to concatenate the feature vector $f_I$ and the feature vector $f_S$, and then a linear projection layer is used:

7

$$f_{IS} = W[f_I; f_S] + b \qquad (1)$$

where $f_{IS}$ represents the fusion vector, W and b represent learnable parameters, and represent linear projection.

Therefore, the CLIP-based encoder may effectively encode semantic content (such as words and meanings) of the speech input and style information (such as face shape, hair style, skin color, and facial expressions) of the identity image into a fusion vector 418. The fusion vector 418 may serve as a better condition for a diffusion-based decoder to generate realistic and diverse speech head videos.

After generating the fusion vector 418, the diffusion-based decoder aims to sample high-resolution frames according to a fusion feature vector from the CLIP-based encoder. The present disclosure uses a diffusion model as the backbone of the decoder, which may generate high-quality and diverse samples for image and video synthesis. The diffusion model models data distribution as a Markov chain, and the Markov chain may gradually convert data into noise through a series of diffusion steps. A process of noise generation is reversed in a denoising step with input data as a condition.

For example, let $x_0$ be an image sampled from the data distribution $p(x_0)$, and let $\in_t \sim N(0, I)$ be Gaussian noise. The diffusion process may be defined as:

$$x_t = \sqrt{1 - \beta_t}\, x_{t-1} + \sqrt{\beta_t}\, \epsilon_t \qquad (2)$$

wherein t=1, . . . , T is a sequential index of the diffusion steps, T represents the total number of the diffusion steps, $\beta_t$ is a noise level of each step, and $x_T$ is a final noise image. The denoising process may be defined as:

$$x_{t-1} = \frac{x_t - \sqrt{\beta_t}\, \epsilon_t}{\sqrt{1 - \beta_t}} \qquad (3)$$

wherein $\in_t$ represents the Gaussian noise sampled from the learned prior distribution $q(\in_t | x_t)$. The denoising process may be modeled using a neural network $f_\theta$ that outputs the parameters of $q(\in_t | x_t)$:

$$q(\epsilon_t | x_t) = f_\theta(x_t, t) \qquad (4)$$

wherein $\theta$ is a learnable parameter of the network, and t is a diffusion step index. The neural network $f_\theta$ may be trained by maximizing a log likelihood of the data:

$$\log p(x_0) = \log p(x_T) + \sum_{t=1}^{T} \log q(\epsilon_t | x_t) \qquad (5)$$

In order to generate frames of a speaker's head conditioned on the fusion feature vector $f_{IS}$, the present disclosure modifies the diffusion model shown as follows:

$$q(\epsilon_t | x_t, f_{IS}) = f_\theta(x_t, f_{IS}, t) \qquad (6)$$

8 wherein $f_\theta$ represents a conditional neural network with $x_t$ and $f_{IS}$ as inputs. A conditional network may be trained by maximizing a conditional log likelihood of the data:

$$\log p(x_0 | f_{IS}) = \log p(x_T | f_{IS}) + \sum_{t=1}^{T} \log q(\epsilon_t | x_t, f_{IS}) \qquad (7)$$

In this way, the diffusion-based decoder may effectively sample the high-resolution frame matching the semantic and style information from the fusion feature vector, so that the generated frames have realistic textures, natural expressions, and consistent motions.

Figure 5:
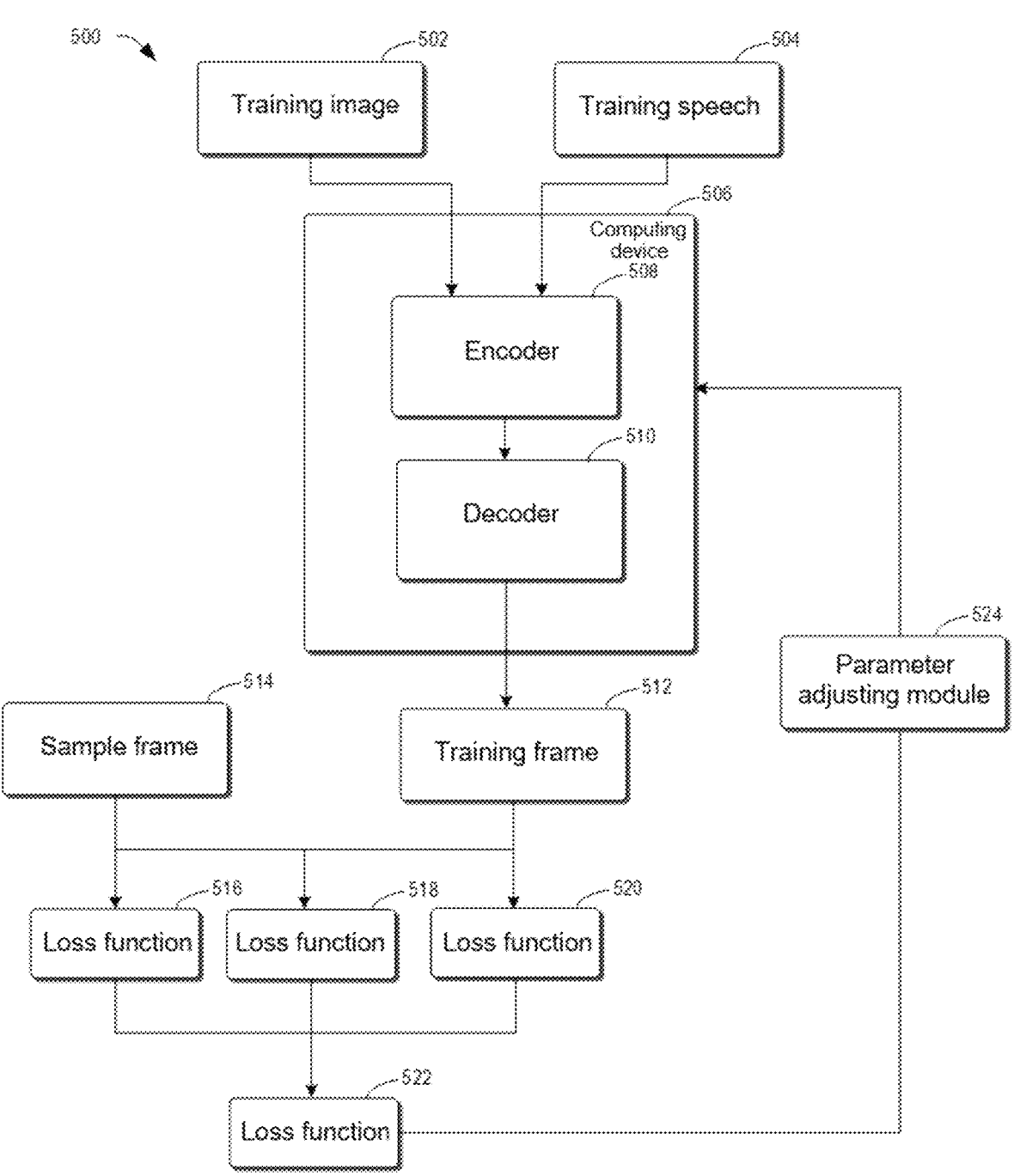
FIG. 5 is a block diagram of a training process according to an example implementation of the present disclosure.

FIG. 5 is a block diagram of a training process 500 according to an example implementation of the present disclosure. In some embodiments, the video generation module 112 may not engage in training. As shown in FIG. 5, a loss function aims to optimize parameters of a framework for generating a video of the present disclosure by training a difference between generated training frames and real frames (also referred to as sample frames). A training image 502 and a training speech 504 are input to an encoder 508 and a decoder 510 in a computing device 506 to generate training frames 512, and the loss function is calculated in conjunction with sample frames 514 (also referred to as real frames). The framework may be optimized using perception, adversarial, and lip synchronization losses in combination.

The perception loss $L_{per}$ (an example of a loss function 516, also referred to as a first loss function) measures a difference between a high-level feature of the generated frames and the real frames extracted by a pre-trained network. The perception loss may capture semantic and style similarities between frames and avoid pixel-level distortion caused by a mean square error (MSE) loss. In some embodiments, a VGG-19 neural network may be used as the pre-trained network, and the perception loss is calculated as follows:

$$L_{per} = \sum_{i=1}^{N} \sum_{l \in L} \frac{1}{C_l H_l W_l} |\phi_l(x_i) - \phi_l(y_i)|_2^2 \qquad (8)$$

wherein N represents the number of frames, L represents a set of layers in the VGG-19 neural network, $C_l$, $H_l$, and $W_l$ respectively represent the channel number, height, and width of the $l^{th}$ layer, $\phi_l$ represents a feature extractor of the $l^{th}$ layer, $x_i$ represents the generated training frame, and $y_i$ represents the real frame.

The adversarial loss $L_{adv}$ (an example of a loss function 518, also referred to as a second loss function) measures a difference between the distribution of the generated frames and the distribution of the real frames. The adversarial loss may encourage the generation of realistic and diverse frames, thereby deceiving a discriminator network. In some embodiments, a block-based discriminator may be used to classify each block in the image as true or false and calculate the adversarial loss as follows:

$$L_{adv} = -\sum_{i=1}^{N} \log D(x_i) \qquad (9)$$

9 wherein N represents the number of frames, D represents the discriminator network, and x_i represents the generated training frames.

The lip synchronization loss $L_{lip}$ (an example of a loss function 520, also referred to as a third loss function) measures a difference in lip motion between the generated frames and the speech input. The lip synchronization loss may ensure that the generated training frames match the speech input in terms of lip synchronization. In some embodiments, a lip reading model may be used, and the model may predict a text sequence according to a video sequence. The lip synchronization loss may be calculated as follows:

$$L_{lip} = -\sum_{i=1}^{N} \log P(T|x_i) \quad (10)$$

wherein N represents the number of frames, P represents the lip reading model, T represents the text sequence transcribed from the speech input, and $x_i$ represents the generated training frames.

A final loss function $L_{total}$ (an example of a loss function 522) is a weighted sum of these three loss functions:

$$L_{total} = \lambda_{per}L_{per} + \lambda_{adv}L_{adv} + \lambda_{lip}L_{lip} \quad (11)$$

wherein $\lambda_{per}$, $\lambda_{adv}$, and $\lambda_{lip}$ represent hyperparameters that control the balance of different losses, namely, weights. A parameter adjusting module 524 may be optimized by adjusting parameters of the framework. For example, $\lambda_{per}$, $\lambda_{adv}$, and $\lambda_{lip}$ may be adjusted to balance relationships between lip motion similarity, face similarity, and style similarity. The loss function 522 may effectively optimize the parameters of the framework by measuring the difference between the generated training frames and the real frames. The loss function 522 may capture semantic and style similarities, authenticity and diversity, and lip synchronization between the frames.

In summary, the method in some embodiments of the present disclosure uses the CLIP-based encoder to extract and fuse semantic and style features from the speech and identity image, while a conventional method uses a separate encoder for each modality or ignore the speech information. The method of the present disclosure uses the diffusion-based decoder to sample the high-resolution frame under the condition of the fusion feature vector, while the conventional method uses a GAN-based or RNN-based decoder, and these decoders may suffer from influences of mode collapse or time inconsistency.

In addition, the method of the present disclosure uses the super-resolution module to enhance the resolution and quality of the generated frames, while some conventional approaches use low-resolution frames or relies on a post-processing technology. Thus, the method of the present disclosure provides significant advancements relative to these and other conventional approaches. For example, the method of the present disclosure can utilize a pre-trained CLIP model to learn the joint representation of speech and identity image, so that the semantic and style information may be captured from the two modalities. This can improve the realism and diversity of the generated speaking avatar as well as the consistency between lip motion and speech content.

In some embodiments, the method of the present disclosure may utilize a diffusion model to sample high-resolution frames conditioned on a fusion feature vector, so as to generate realistic textures, natural expressions, and consistent motions. This may improve the quality and diversity of the generated speaking avatar, and avoid the problem of mode collapse or time inconsistency of the GAN-based or RNN-based decoder.

In some embodiments, the method of the present disclosure may utilize super-resolution technology to enhance the resolution and quality of the generated frames, so as to generate clearer details, clearer edges, and smoother transitions. This can improve the visual quality and perceptual quality of the generated speaking avatar, and directly reduce the calculation cost and memory consumption for generating high-resolution frames.

Figure 6:
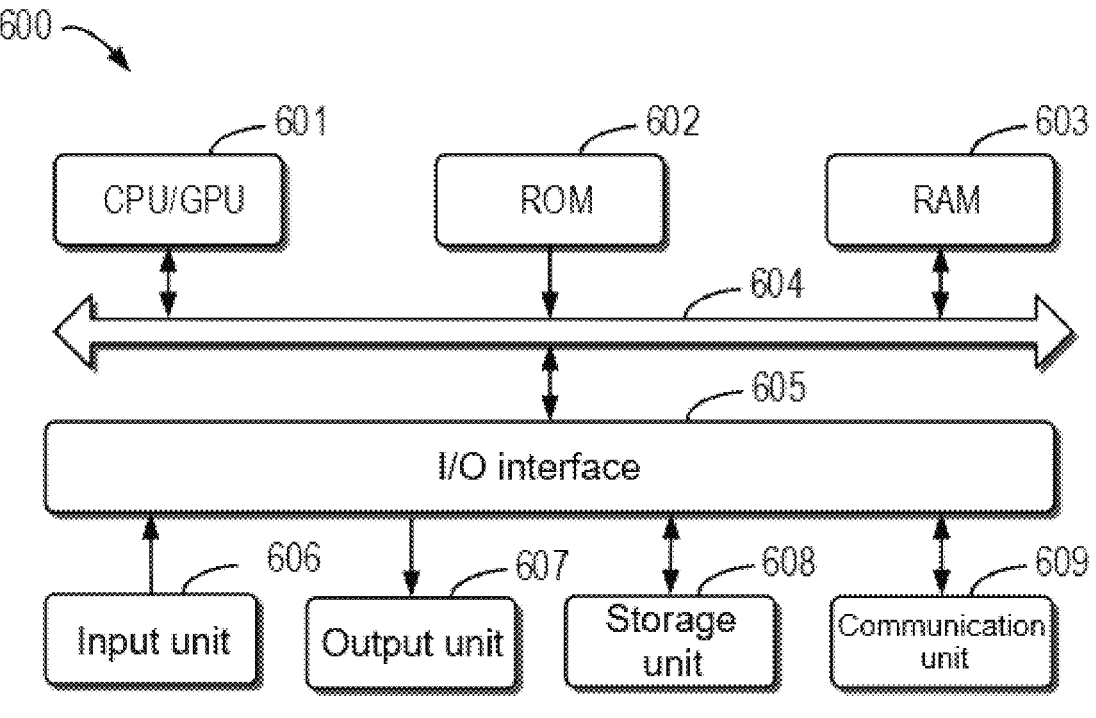
FIG. 6 is a block diagram of a device for generating a video according to an example implementation of the present disclosure.

FIG. 6 is a block diagram of a device 600 that may be used to implement embodiments of the present disclosure. The device 600 may be a device or apparatus as described in embodiments of the present disclosure. As shown in FIG. 6, the device 600 includes at least one central processing unit and/or at least one graphics processing unit (CPU/GPU) 601 that may perform various appropriate actions and processing according to computer program instructions stored in a read-only memory (ROM) 602 or computer program instructions loaded from a storage unit 608 into a random access memory (RAM) 603. Various programs and data required for the operation of the device 600 may also be stored in the RAM 603. The CPU/GPU 601, the ROM 602, and the RAM 603 are connected to one another through a bus 604. An input/output (I/O) interface 605 is also connected to the bus 604. Although not shown in FIG. 6, the device 600 may also include a co-processor.

Multiple components in the device 600 are connected to the I/O interface 605, including: an input unit 606, such as a keyboard and a mouse; an output unit 607, such as various types of displays and speakers; the storage unit 608, such as a magnetic disk and a compact disc; and a communication unit 609, such as a network card, a modem, and a wireless communication transceiver. The communication unit 609 allows the device 600 to exchange information/data with other devices via a computer network, such as the Internet, and/or various telecommunication networks.

The various methods or processes described above may be executed by the CPU/GPU 601. For example, in some embodiments, the methods may be implemented as a computer software program that is tangibly included in a machine-readable medium such as the storage unit 608. In some embodiments, part of or all the computer program can be loaded and/or installed onto the device 600 via the ROM 602 and/or the communication unit 609. When the computer program is loaded into the RAM 603 and executed by the CPU/GPU 601, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/ processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of the instruction including one or more executable instructions for implementing specified logical functions. In some alternative implementations, the functions denoted in the blocks may also occur in an order different from that denoted in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of a dedicated hardware and computer instructions.

Various embodiments of the present disclosure have been described above. The above descriptions are illustrative, rather than exhaustive, and are not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for generating a video, comprising:
   obtaining a reference image and a reference speech, the reference image specifying a head of a target object in the video, and the reference speech specifying a voice of the target object;
   generating, based on the reference image and the reference speech, a fusion vector by combining a feature of the head and a feature of the voice;
   generating, based on the fusion vector, a plurality of video frames in the video that represents the target object speaking in a timbre of the reference speech by denoising a plurality of initial frames comprising noise; and generating the video based on the plurality of video frames.

2. The method according to claim 1, wherein combining the feature of the head and the feature of the voice comprises:

generating a first vector based on the reference image;

generating a second vector based on the reference speech;

generating a third vector by concatenating the first vector and the second vector; and generating the fusion vector based on a linear projection of the third vector.

3. The method according to claim 1, wherein generating, based on the reference image and the reference speech, the fusion vector by combining the feature of the head and the feature of the voice comprises:

generating corresponding text based on the reference speech; and generating the fusion vector comprising a semantic feature of the text and a style feature of the reference image based on the reference image and the corresponding text.

4. The method according to claim 3, wherein the style feature comprises at least one of face shape, hair style, skin color, and facial expressions.

5. The method according to claim 1, wherein generating, based on the fusion vector, the plurality of video frames in the video that represents the target object speaking in the timbre of the reference speech by denoising the plurality of initial frames comprising noise comprises:

sampling a first image based on a predetermined data distribution and Gaussian noise;

predicting first noise in the first image under a constraint of the fusion vector; and acquiring a second image by removing the first noise from the first image.

6. The method according to claim 5, further comprising:

predicting, based on the second image and the Gaussian noise, second noise of the second image under the constraint of the fusion vector;

acquiring a de-noised second image by removing the second noise from the second image; and determining the plurality of video frames by maximizing a log likelihood associated with a combination of the first image, the second image, the first noise, and the second noise.

7. The method according to claim 1, wherein a resolution of the video is higher than a resolution of the plurality of video frames, and wherein generating the video with the resolution higher than the resolution of the plurality of video frames based on the plurality of video frames comprises:

generating a video frame set with increased resolution based on each video frame of the plurality of video frames; and generating, based on the video frame set with increased resolution, the video that is consistent with at least one of expression, action, and texture comprised in the reference image and the reference speech, wherein the resolution and frame rate of the video are higher than those of the video frame set.

8. The method according to claim 1, wherein the method is performed in a multi-modal machine learning model, and training the multi-modal machine learning model comprises:

determining a first loss function associated with a difference between features of training frames and sample frames;

determining a second loss function associated with a difference between distribution of the training frames and distribution of the sample frames;

determining a third loss function associated with a difference between a lip motion of the training frames and a sample speech; and training the multi-modal machine learning model based on the first loss function, the second loss function, and the third loss function.

9. The method according to claim 8, wherein training the multi-modal machine learning model based on the first loss function, the second loss function, and the third loss function comprises:

determining a first weight of the first loss function, a second weight of the second loss function, and a third weight of the third loss function respectively;

determining a final loss function based on the first weight, the first weight, and the third weight; and training the multi-modal machine learning model based on the final loss function.

10. The method according to claim 9, further comprising:

balancing at least one of lip motion similarity, face similarity, and style similarity in the generated video by adjusting the first weight, the first weight, and the third weight.

11. An electronic device, comprising:

at least one processor; and memory coupled to the at least one processor, wherein the memory has instructions stored therein, and the instructions, when executed by the at least one processor, cause the electronic device to perform actions comprising:

obtaining a reference image and a reference speech, the reference image specifying the head of a target object in a video, and the reference speech specifying voice of the target object;

generating, based on the reference image and the reference speech, a fusion vector by combining a feature of the head and a feature of the voice;

generating, based on the fusion vector, a plurality of video frames in the video that represents the target object speaking in a timbre of the reference speech by denoising a plurality of initial frames comprising noise; and generating the video based on the plurality of video frames.

12. The electronic device according to claim 11, wherein combining the feature of the head and the feature of the voice comprises:

generating a first vector based on the reference image;

generating a second vector based on the reference speech;

generating a third vector by concatenating the first vector and the second vector; and generating the fusion vector based on a linear projection of the third vector.

13. The electronic device according to claim 11, wherein generating, based on the reference image and the reference speech, the fusion vector by combining the feature of the head and the feature of the voice comprises:

generating corresponding text based on the reference speech; and generating the fusion vector comprising a semantic feature of the text and a style feature of the reference image based on the reference image and the corresponding text.

14. The electronic device according to claim 13, wherein the style feature comprises at least one of face shape, hair style, skin color, and facial expressions.

15. The electronic device according to claim 11, wherein generating, based on the fusion vector, the plurality of video frames in the video that represents the target object speaking in the timbre of the reference speech by denoising the plurality of initial frames comprising noise comprises:

sampling a first image based on a predetermined data distribution and Gaussian noise;

predicting first noise in the first image under a constraint of the fusion vector; and acquiring a second image by removing the first noise from the first image.

16. The electronic device according to claim 15, wherein the actions further comprise:

predicting, based on the second image and the Gaussian noise, second noise of the second image under the constraint of the fusion vector;

acquiring a de-noised second image by removing the second noise from the second image; and determining the plurality of video frames by maximizing a log likelihood associated with a combination of the first image, the second image, the first noise, and the second noise.

17. The electronic device according to claim 11, wherein a resolution of the video is higher than a resolution of the plurality of video frames, and wherein generating the video with the resolution higher than the resolution of the plurality of video frames based on the plurality of video frames comprises:

generating a video frame set with increased resolution based on each video frame of the plurality of video frames; and generating, based on the video frame set with increased resolution, the video that is consistent with at least one of expression, action, and texture comprised in the reference image and the reference speech, wherein the resolution and frame rate of the video are higher than those of the video frame set.

18. The electronic device according to claim 11, wherein the actions are performed in a multi-modal machine learning model in the electronic device, and training the multi-modal machine learning model comprises:

determining a first loss function associated with a difference between features of training frames and sample frames;

determining a second loss function associated with a difference between distribution of the training frames and distribution of the sample frames;

determining a third loss function associated with a difference between a lip motion of the training frames and a sample speech; and training the multi-modal machine learning model based on the first loss function, the second loss function, and the third loss function.

19. The electronic device according to claim 18, wherein training the multi-modal machine learning model based on the first loss function, the second loss function, and the third loss function comprises:

determining a first weight of the first loss function, a second weight of the second loss function, and a third weight of the third loss function respectively;

determining a final loss function based on the first weight, the first weight, and the third weight; and training the multi-modal machine learning model based on the final loss function, wherein the actions further comprise:

balancing at least one of lip motion similarity, face similarity, and style similarity in the generated video by adjusting the first weight, the first weight, and the third weight.

20. A computer program product comprising a non-transitory computer-readable medium having machine-executable instructions stored therein, wherein the machine-executable instructions, when executed by a machine, cause the machine to perform actions comprising:

obtaining a reference image and a reference speech, the reference image specifying the head of a target object in a video, and the reference speech specifying voice of the target object;

generating, based on the reference image and the reference speech, a fusion vector by combining a feature of the head and a feature of the voice;

generating, based on the fusion vector, a plurality of video frames in the video that represents the target object speaking in a timbre of the reference speech by denoising a plurality of initial frames comprising noise; and generating the video based on the plurality of video frames.

* * * * *